US012690587B2

(12) United States Patent (10) Patent No.: US 12,690,587 B2
Goodrich (45) Date of Patent: Jul. 28, 2026

(54) ANIMAL AND INSECT REPELLENT AND METHOD OF ITS USE

(71) Applicant: Cranberry IP, LLC, Mendham, NJ (US)

(72) Inventor: Kristopher Goodrich, Far Hills, NJ (US)

( * ) Notice: Subject to any disclaimer, the term of this patent is extended or adjusted under 35 U.S.C. 154(b) by 380 days.

(21) Appl. No.: 18/384,937

(22) Filed: Oct. 30, 2023

(65) Prior Publication Data

US 2025/0134101 A1 May 1, 2025

(51) Int. Cl.
| | |
|---|---|
| *A01N 37/36* | (2006.01) |
| *A01N 25/22* | (2006.01) |
| *A01N 25/24* | (2006.01) |
| *A01N 63/23* | (2020.01) |
| *A01N 65/26* | (2009.01) |
| *A01P 17/00* | (2006.01) |
| *E04H 17/00* | (2006.01) |

(52) U.S. Cl.
CPC ............. *A01N 37/36* (2013.01); *A01N 25/22* (2013.01); *A01N 25/24* (2013.01); *A01N 63/23* (2020.01); *A01N 65/26* (2013.01); *A01P 17/00* (2021.08); *E04H 17/017* (2021.01)

(58) Field of Classification Search
None
See application file for complete search history.

(56) References Cited

U.S. PATENT DOCUMENTS

| | | | |
|---|---|---|---|
| 2011/0177149 A1 | 7/2011 | Messina | |
| 2023/0137223 A1* | 5/2023 | Huber | A01N 31/16 |
| | | | 424/739 |
| 2023/0148611 A1* | 5/2023 | Huckabee | A01N 25/30 |
| | | | 424/405 |

* cited by examiner

*Primary Examiner* — Brian Gulledge

(74) *Attorney, Agent, or Firm* — Law Office of Ilya Libenzon

(57) ABSTRACT

A broad-spectrum animal and insect repellent composition is disclosed. The composition includes a mixture of water, butyl lactate and at least one essential oil. The composition can also include at least one sticking agent, animal deterrent component, preservative and thickener. Additionally, the composition can include at least one surfactant. The method of using the repellent composition of the present invention is also disclosed. The method includes the steps of applying the repellent by spraying onto plants, grass, ground, or their combination, with the frequency ranging from one time per month to four times per month. The method can also include the step of applying the repellent by spraying on a rope or ribbon surrounding an area to be protected and can be further electrified with an electric fence charger.

11 Claims, No Drawings

ANIMAL AND INSECT REPELLENT AND METHOD OF ITS USE

TECHNICAL FIELD

Embodiments disclosed herein relate generally to an animal and insect repellent and method of its use, and more particularly, to a broad-spectrum composition for repelling a large variety of animals including rodents as well as insects.

BACKGROUND ART

The need for effective animal, rodent, and insect repellents is paramount in safeguarding both human health and property. As our world becomes more interconnected and urbanized, the cohabitation of humans and various pests becomes increasingly prevalent. Insects, rodents, and animals can pose serious health risks through the transmission of diseases, and they can cause extensive damage to crops, homes, and infrastructure. Consequently, repellents play a crucial role in mitigating these threats. They provide a non-lethal and environmentally friendly solution to deter unwanted pests, promoting coexistence without harm. Furthermore, as the global climate continues to change, the prevalence of pests may increase, making the development and use of repellents even more vital. Hence, the need for animal, rodent, and insect repellents is not only a matter of convenience but a fundamental element of public health and environmental stewardship in an ever-evolving world.

For example, white tail deer (*Odocoileus virginianus*), also called Virginia deer, common American deer of the family Cervidae (order Artiodactyla), as well as related species, within the United States cause millions of dollars in damage to residential and commercial landscapes throughout the United States with heavier pressure seen during fall and winter as natural landscapes grow dormant. While these herbivores have discerning taste, consuming, on average, more than six pounds of foliage a day to maintain healthy a healthy body mass and continue procreation of the species, their foraging preferences change with readily available material, with a growing focus in the form of esthetically planted and maintained landscapes that provide an even more diverse selection of material available to these animals throughout the year. In addition, these supplementary plant species tend to present more robust and attractive choices for foraging than those plants found naturally in forests, fields, and other natural and/or preserved areas, further drawing the attention of deer and related species looking for sources of energy. Further, there is ample evidence that there are no toxic plants to a deer only a preference of most attractive to least attractive, with the earlier category comprised of commonly chosen plants found in ornamental landscapes.

There have been numerous animal and insect repellents offered in the marketplace to mitigate these losses, but performance varies wildly once they are introduced to varied weather patterns and differing population pressure.

Thus, the limited effectiveness of commercially available repellents underscores the urgent need for the development of a new, more efficient repellent solution.

SUMMARY OF THE EMBODIMENTS

The present invention provides a broad-spectrum animal, rodent and insect repellent composition. The composition includes a mixture of water, butyl lactate and at least one essential oil, which can be any essential oil such as mint oil, cornmint oil, clove oil, wintergreen oil or combination thereof, for example. Mint oil can include oils extracted from various species of the mint plant, which belongs to the *Mentha* genus. This can include oils from peppermint (*Mentha piperita*), spearmint (*Mentha spicata*), and other mint varieties. These oils can have distinct flavors and aromas, with peppermint oil, for example, having a strong, peppery menthol scent and flavor. Cornmint oil can include oils extracted from the cornmint plant known as *Mentha arvensis* and is characterized by its high menthol content.

Additionally, the composition of the present invention can include but not limited to other essential oils such citronella, lemongrass, cedar, geraniol, cedarwood oil, geranium oil, rosemary oil, thyme oil, garlic oil or their combination. In some instances, the composition can include but not limited to castor oil, cinnamon oil, citronella oil, clove oil, corn oil, cornmint oil, cottonseed oil, garlic oil, geranium oil, lemongrass oil, linseed oil, peppermint oil, rosemary oil, sesame oil, soybean oil, spearmint oil, thyme oil and their combination.

The composition can also include at least one sticking agent, animal deterrent component, preservative, thickener, surfactant, or their combination.

According to a method of the present invention, the repellent composition can be sprayed onto plants, grass, and ground. In some instances, it can be sprayed on a rope or ribbon that surrounds an area to be protected. In some instances, the rope or ribbon can be electrified with an electric fence charger for animals. The repellent can also be applied on, in and around structures by spraying. In some instances, the repellent can be used in conjunction with sprinklers, including motion-activated sprinklers.

Other aspects, embodiments and features of the composition and method will become apparent from the following detailed description.

DETAILED DESCRIPTION

The present invention provides a broad-spectrum animal, rodent and insect repellent composition. The composition includes a mixture of water, butyl lactate and at least one essential oil, which can be mint oil, cornmint oil, clove oil, wintergreen oil or combination thereof. Mint oil can include oils extracted from various species of the mint plant, which belongs to the *Mentha* genus. This can include oils from peppermint (*Mentha piperita*), spearmint (*Mentha spicata*), and other mint varieties. These oils can have distinct flavors and aromas, with peppermint oil, for example, having a strong, peppery menthol scent and flavor. Cornmint oil can include oils extracted from the cornmint plant known as *Mentha arvensis* and is characterized by its high menthol content. Additionally, the composition of the present invention can include but not limited to other essential oils such citronella, lemongrass, cedar, geraniol, cedarwood oil, eugenol, geranium oil, rosemary oil, thyme oil, garlic oil, or their combination. In some instances, the composition can include but not limited to castor oil, cinnamon oil, citronella oil, clove oil, corn oil, cornmint oil, cottonseed oil, garlic oil, geranium oil, lemongrass oil, linseed oil, peppermint oil, rosemary oil, sesame oil, soybean oil, spearmint oil, thyme oil and their combination.

It will be understood by a person skilled in the art that the repellent composition can include a variety of essential oils derived from different plant species. Here are some non-limiting examples of essential oils and the plant species they come from: Lavender oil (*Lavandula angustifolia*), Peppermint oil (*Mentha x piperita*), Tea tree oil (*Melaleuca alternifolia*), Eucalyptus oil (*Eucalyptus globulus*), Lemon oil (*Citrus limon*), Orange oil (*Citrus sinensis*), Rose oil (*Rosa damascena*), Frankincense oil (*Boswellia sacra*), Chamomile oil (*Matricaria chamomilla*), Sandalwood oil (*Santalum album*), Patchouli oil (*Pogostemon cablin*), Cedarwood oil (*Cedrus atlantica*), Peppermint oil (*Mentha piperita*), Bergamot oil (*Citrus bergamia*), and Geranium oil (*Pelargonium graveolens*).

The composition of the present invention can further include at least one sticking agent, such as clay or eggs or combination thereof. Clay can include a wide range of naturally occurring minerals and soil types including kaolin clay, bentonite clay and the like. It will be understood by a person skilled in the art that other various agents or binders such as water-based adhesives, starch paste and gels can be used as a sticking agent in the composition of the present invention. The composition of the present invention can further include at least one animal deterrent component, which can be eggs, putrescent (i.e., decomposed and rotted) whole egg solids, or combination thereof. The composition can also include at least one preservative, which can be vinegar, potassium sorbate, or combination thereof. In some instances, the composition can include other similar preservatives such as acetic acid, sodium benzoate, sulfites, sorbic acid, ascorbic acid (vitamin C), nitrates and nitrites, propionic acid, or their combination.

The repellent composition of the present invention can also include at least one thickener that is Xanthan gum, Guar Gum, cornstarch, Beta-Cyclodextrin or combination thereof. In some instances, the thickeners can be arrowroot, tapioca starch/flour, potato starch, rice flour, agar-agar, gelatin, pectin, kuzu root starch, konjac flour, locust bean gum, guarana, wheat flour, or combination thereof.

Additionally, the repellent composition can include at least one surfactant, such as Ethyl Lactate for example. The surfactant can be selected from ethoxylated alcohols, alkyl polyglycosides (APGs), ethoxylated fatty alcohols, and sorbitan esters, lactylates, diesters, esters, such as glyceryl stearate, alkyl polyglucosides, sodium lauryl sulfate, pine oil, and combination thereof. In some instances, the repellent composition of the present invention can include at least one insecticide such as 2-phenylpropionate, for example. Other insecticides may include pyrethroids, organophosphates, neonicotinoids, biological insecticides such as bacteria, fungi, *Bacillus thuringiensis*, and the like, as well as botanical insecticides such as neem oil, for example.

According to some embodiments of the present invention, the concentration of Butyl Lactate in the repellent concentrate composition can be in the range from 1 wt. % to 40 wt. %, preferably from 5 wt. % to 25 wt. %, and more preferably from 8 wt. % to 20 wt. %. The concentration of essential oil varies from 0.1 wt. % to 10 wt. %, preferably from 0.3 wt. % to 8 wt. %, and more preferably from 0.5 wt. % to 6 wt. %. The concentration of the sticking agent can vary from 0.07 wt. % to 8 wt. %, preferably from 0.5 wt. % to 5 wt. %, and more preferably from 1 wt. % to 4 wt. %. The concentration of the thickener can be from 0.03 wt. % to 1.5 wt. %, preferably from 0.06 wt. % to 1.25 wt. %, and more preferably from 0.08 wt. % to 1 wt. %. The concentration of eggs (as a sticking agent and animal deterrent component) can vary from 0.1 wt. % to 30 wt. %, preferably from 2 wt. % to 25 wt. %, and more preferably from 4 wt. % to 20 wt. %. The concentration of the preservative such as vinegar can vary from 0.01 wt. % to 6 wt. %, preferably from 0.3 wt. % to 4 wt. %, and more preferably from 0.5 wt. % to 3 wt. %, whereas the concentration of potassium sorbate (as a preservative component) can be in the range from 0.03 wt. % to 1.5 wt. %, preferably from 0.06 wt. % to 1.25 wt. %, and more preferably from 0.1 wt. % to 1 wt. %. Water can be in the range from 0 wt. % to 98 wt. %, preferably from 35 wt. % to 91 wt. %, and more preferably from 50 wt. % to 85 wt. %. The repellent composition can be sold in the form of a concentrate and then diluted with water to between 8 wt. % and 14 wt. % accordingly with the concentrate to water ratio ranging from 4:50 to 50:96, preferably 6:65 to 35:94, and more preferably from 8:80 to 20:92. Alternatively, the concentrate can be diluted with water and sold as a ready to use formulation.

In some instances, the concentration of Butyl Lactate in the repellent concentrate composition can be in the range from 2 wt. % to 50 wt. %, preferably from 3 wt. % to 35 wt. %, and more preferably from 6 wt. % to 20 wt. %. The concentration of essential oil varies from 0.1 wt. % to 20 wt. %, preferably from 0.3 wt. % to 8 wt. %, and more preferably from 0.5 wt. % to 6 wt. %. The concentration of the insecticide component, such as 2-phenylpropionate can vary from 1 wt. % to 22 wt. %, preferably from 2 wt. % to 15 wt. %, and more preferably from 3 wt. % to 10 wt. %. The concentration of the surfactant component such as Ethyl Lactate, for example can vary from 0.1 wt. % to 20 wt. %, preferably from 0.3 wt. % to 8 wt. %, and more preferably from 0.5 wt. % to 6 wt. %. The concentration of the sticking agent such as Clay for example, can vary from 0.07 wt. % to 8 wt. %, preferably from 0.5 wt. % to 5 wt. %, and more preferably from 1 wt. % to 4 wt. %. The concentration of the thickener such as Xanthum Gum, for example can vary from 0.03 wt. % to 6 wt. %, preferably from 0.1 wt. % to 5 wt. %, and more preferably from 0.3 wt. % to 4 wt. %. Water can be in the range from 0 wt. % to 96.3 wt. %, preferably from 20 wt. % to 93 wt. %, and more preferably from 40 wt. % to 87 wt. %. The repellent composition can be sold in the form of a concentrate and then diluted with water to between 3 wt. % and 10 wt. % accordingly with the concentrate to water ratio ranging from 1:70 to 30:99, preferably 2:80 to 20:98, and more preferably from 3:90 to 10:98. Alternatively, the concentrate can be diluted with water and sold as a ready to use formulation.

According to a method of the present invention, the repellent composition can be sprayed onto plants, grass, and ground. In some instances, it can be sprayed on a rope or ribbon that surrounds an area to be protected. In some instances, the rope or ribbon can be electrified with an electric fence charger for animals. The repellent can also be applied on, in and around structures by spraying. In some instances, the repellent can be used in conjunction with sprinklers, including motion-activated sprinklers. According to some embodiments of the present invention, the repellent is applied one time per month. In some instances, the repellent is applied two times per month, three times per month or four times per month.

The performance of repellent composition of the present invention was evaluated by the inventor of the present invention in a study that lasted for approximately one year using twenty-one monitored test sites to field test the effectiveness of the composition that included butyl lactate. These sites each had three monitored areas: formulation with butyl lactate (1), same formulation without butyl lactate (2), and control (3), each approximately 100-200 square feet in size. Due to the proximity of the sites, the range of climates, food sources and types of species were consistent, making it easy to assess the repellent's effectiveness, which was evaluated by means of visual inspections and rating for animal tracks around and in the areas, and browsing damage to the plant material. The results were calculated over the 12-month period for a resulting average number, which are summarized in Table 1 below.

TABLE 1

Butyl Lactate Formula (BLF) vs Formula without Butyl Lactate
(F) vs Control (C) over a 12-month period. Animal [Deer]

| Formulation | 12 Month Average for Days Until Noticeable Tracks | 12 Month Average for Days Until Noticeable Damage |
|---|---|---|
| BLF | 30 | 37 |
| F | 20 | 26 |
| C | 5 | 15 |

The control areas overwhelmingly showed unfavorable results and provided for secondary confirmation that deer were present in the various sites throughout the course of the observations. In treated area, while the formula without Butyl Lactate showed repellency for an average of 26 days, the Butyl Lactate formula provided for longer repellence with an average of 37 days before noticeable damage and entry. Continued applications at 60-day intervals was sufficient to show the BLF composition could be used by applicators on a monthly schedule to reduce animal entry and foraging in most areas.

Butyl lactate proves to be effective component in natural repellents by decreasing white tail deer damage and entry into areas where it is used for more than 30 days with regular and consistent use. In addition, it can be established that repeated exposure to the product produces the wanted result of changing animal tendencies, so as to train animals to avoid certain areas where the product is applied. It can be assumed, without the intent to be bound by this theory, that while essential oils may have the ability to cause animal deterrence, Butyl lactate, an ester, enhances the longevity of these oils once introduced to natural elements and as the animals that come in contact with it would experience irritation in their olfactory receptors for a longer duration. It can also be hypothesized, without the intent to be bound by this theory, that the Butyl lactate enabled the taste deterrent of these oils to perform longer.

Within the 60-day application periods, sites where applications were made showed reduced animal presence and a substantially decreased amount in all but one location for more than 30 days where Butyl lactate was used. It was also observed that during light rain and misting, the animals kept a further distance from treated areas, leading observers to believe that the formula would be reactivated and as strong as first applied. One could postulate that the animals disliked the taste of the repellent and discontinued feeding on their heretofore preferred locations. In conclusion, this study produced significant evidence that an essential oil deer repellent combined with Butyl lactate prevented white tail deer from entering and foraging in and on treated areas for longer period of time than essential oil-based repellents alone. The same promising results have been shown for rodents.

Similar results, summarized in Tables 2-5 below, have been shown for Goose, Tick, and Mosquito accordingly.

TABLE 2

Applications made Feb-Oct. 2022 and 2023

| Goose Control | Total # of Applications | Reports & Extra Treatment Needed | Test Sites | % of reports to test sites | |
|---|---|---|---|---|---|
| W/ Butyl lactate | 29 | 0 | 4 | 0.00% | Reported Geese between treatments |
| W/O Butyl lactate | 35 | 3 | 5 | 60.00% | Reported Geese between treatments |
| | | | | −100.00% | Change in reported |

TABLE 3

Applications made April-Oct 2023

| Tick Control | Total # of Applications | Reports & Extra Treatment Needed | Test Sites | % of reports to test sites | |
|---|---|---|---|---|---|
| W/ Butyl lactate | 338 | 11 | 100 | 11.00% | Reported Tick between treatments |
| W/O Butyl lactate | 401 | 33 | 115 | 28.70% | Reported Tick between treatments |
| | | | | −61.67% | Change in reported |

TABLE 4

Applications made April-Oct 2023

| Mosquito Control | Total # of Applications | Reports & Extra Treatment Needed | Test Sites | % of reports to test sites | |
|---|---|---|---|---|---|
| W/ Butyl lactate | 368 | 15 | 51 | 29.41% | Reported mosquitos between treatments |

TABLE 4-continued

| Applications made April-Oct 2023 | | | | | |
|---|---|---|---|---|---|
| Mosquito Control | Total # of Applications | Reports & Extra Treatment Needed | Test Sites | % of reports to test sites | |
| W/O Butyl lactate | 445 | 28 | 64 | 43.75% | Reported mosquitos between treatments |
| | | | | −32.77% | Change in reported |

TABLE 5

| Applications made Jan-April 2023 | | | | | |
|---|---|---|---|---|---|
| Deer Control | Total # of Applications | Reports & Extra Treatment Needed | Test Sites | % of reports to test sites | |
| W/ Butyl lactate | 2428 | 97 | 723 | 13.42% | Reported Damage |
| W/O Butyl lactate | 3153 | 266 | 1046 | 25.43% | Reported Damage |
| | | | | −47.24% | Change in reported |

Non-Limiting Examples

Following are a few non-limiting examples for a broad-spectrum animal and insect repellent composition of the present invention.

In a first example, the repellent concentrate composition includes a mixture of 20 wt. % Butyl Lactate, 2 wt. % Mint Oil, 2 wt. % Clay, 0.5 wt. % Xanthan gum, 15 wt. % Eggs, 2.0 wt. % Vinegar and 58.5 wt. % water. The concentrate composition is further diluted with water to 14 wt. % to make it as a ready to use formulation.

In a second example, the repellent concentrate composition includes a mixture of 20 wt. % Butyl Lactate, 2 wt. % Mint Oil, 2 wt. % Clove Oil, 2 wt. % Clay, 0.5 wt. % Xanthan gum, 15 wt. % Eggs, 2.0 wt. % Vinegar and 60.5 wt. % water. The concentrate composition is further diluted with water to 10 wt. % to make it as a ready to use formulation.

In a third example, the repellent concentrate composition includes a mixture of 20 wt. % Butyl Lactate, 2 wt. % Mint Oil, 2 wt. % Clove Oil, 2 wt. % Wintergreen Oil, 2 wt. % Clay, 0.5 wt. % Xanthan gum, 15 wt. % Eggs, 2.0 wt. % Vinegar and 62.5 wt. % water. The concentrate composition is further diluted with water to 14 wt. % to make it as a ready to use formulation.

In a fourth example, the repellent concentrate composition includes a mixture of 15 wt. % Butyl Lactate, 1.0 wt. % Mint Oil, 1.5 wt. % Clove Oil, 1.0 wt. % Wintergreen Oil, 2 wt. % Clay, 0.35 wt. % Xanthan gum, 15 wt. % Eggs, 2.0 wt. % Vinegar, 0.25 wt. % Potassium Sorbate and 61.9 wt. % water. The concentrate composition is further diluted with water to 10 wt. % to make it as a ready to use formulation.

In a fifth example, the repellent concentrate composition includes a mixture of 8 wt. % Butyl Lactate, 3 wt. % clove oil, 5 wt. % citronella oil, 2 wt. % lemongrass oil, 5 wt. % cedar oil, 2 wt. % geraniol oil, 4 wt. % 2-phenylpropionate, 2 wt. % ethyl lactate, 3 wt. % clay, 4 wt. % Xanthum Gum, and 62 wt. % water. The concentrate composition is further diluted with water to 5 wt. % to make it as a ready to use formulation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and FIGURES, if any are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. A broad-spectrum animal and insect repellent concentrate composition comprising:

a mixture of water, butyl lactate, mint oil, clay, xanthan gum, eggs, and vinegar, wherein, based on a total weight of the repellent concentrate composition, the mixture comprises 20 wt. % butyl lactate, 2 wt. % mint oil, 2 wt. % clay, 0.5 wt. % xanthan gum, 15 wt. % eggs, 2.0 wt. % vinegar, and 58.5 wt. % water, and wherein the foregoing components account for 100 wt. % of the repellent concentrate composition.

2. The repellent concentrate composition of claim 1, wherein the mint oil comprises peppermint oil, spearmint oil, or a combination thereof.

3. The repellent concentrate composition of claim 1, wherein the clay is a sticking agent.

4. The repellent concentrate composition of claim 1, wherein the clay is kaolin clay, bentonite clay, or a combination thereof.

5. The repellent concentrate composition of claim 1, wherein the eggs are an animal deterrent component.

6. The repellent concentrate composition of claim 1, wherein the vinegar is a preservative.

7. The repellent concentrate composition of claim 1, wherein the xanthan gum is a thickener.

8. A method of using the repellent of claim 1, comprising the steps of:

applying the repellent by spraying onto plants, grass, ground or combination thereof at the frequency of 1 time per month to 4 times per month.

9. A method of using the repellent of claim 1, comprising the steps of:

applying the repellent by spraying on a rope or ribbon surrounding an area to be protected at the frequency of 1 time per month to 4 times per month.

10. The method of claim 9 wherein the rope or ribbon is further electrified with an electric fence charger.

11. A ready-to-use broad-spectrum animal and insect repellent formulation comprising a repellent concentrate composition and added water, wherein the repellent concentrate composition is present at 14 wt. % of the ready-to-use formulation and the added water is present at 86 wt. % of the ready-to-use formulation, wherein the repellent concentrate composition comprises, based on a total weight of the repellent concentrate composition, 20 wt. % butyl lactate, 2 wt. % mint oil, 2 wt. % clay, 0.5 wt. % xanthan gum, 15 wt. % eggs, 2.0 wt. % vinegar, and 58.5 wt. % water, and wherein the butyl lactate, mint oil, clay, xanthan gum, eggs, vinegar, and water account for 100 wt. % of the repellent concentrate composition, and the repellent concentrate composition and added water account for 100 wt. % of the ready-to-use formulation.

* * * * *